(12) United States Patent
Summers et al.

(10) Patent No.: US 9,668,034 B2
(45) Date of Patent: May 30, 2017

(54) SYSTEMS AND METHODS FOR COMMUNICATING DATA OF A POWER TRANSMISSION LINE

(71) Applicant: Goodrich Corporation, Charlotte, NC (US)

(72) Inventors: Paul L. Summers, Troy, OH (US); Eric Stein, Troy, OH (US); Philip Readio, Phoenix, AZ (US)

(73) Assignee: Goodrich Corporation, Charlotte, NC (US)

( * ) Notice: Subject to any disclaimer, the term of this patent is extended or adjusted under 35 U.S.C. 154(b) by 52 days.

(21) Appl. No.: 14/622,094

(22) Filed: Feb. 13, 2015

(65) Prior Publication Data

US 2016/0241935 A1 Aug. 18, 2016

(51) Int. Cl.
*B60R 25/10* (2013.01)
*H04Q 9/00* (2006.01)
*H04B 5/00* (2006.01)
*H04B 5/02* (2006.01)
*H02J 50/80* (2016.01)

(52) U.S. Cl.
CPC ............... *H04Q 9/00* (2013.01); *H02J 50/80* (2016.02); *H04B 5/0031* (2013.01); *H04B 5/0037* (2013.01); *H04B 5/0043* (2013.01); *H04B 5/0093* (2013.01); *H04B 5/02* (2013.01); *H04Q 2209/40* (2013.01)

(58) Field of Classification Search
CPC ............ B60C 23/0408; B60C 23/0427; B60C 23/043
USPC ......... 340/505, 539.22, 539.26, 960, 426.24, 340/426.33
See application file for complete search history.

(56) References Cited

U.S. PATENT DOCUMENTS

| 2006/0244568 | A1 | 11/2006 | Tong et al. | |
|---|---|---|---|---|
| 2010/0026461 | A1* | 2/2010 | Merchan | G06K 19/0723 340/10.1 |
| 2011/0181396 | A1* | 7/2011 | Hilla, Jr. | G06F 21/35 340/10.1 |
| 2014/0009109 | A1* | 1/2014 | Lee | H02J 17/00 320/108 |

(Continued)

OTHER PUBLICATIONS

Extended European Search Report dated Jul. 11, 2016 in European Application No. 16155651.9.

*Primary Examiner* — Kevin Kim
(74) *Attorney, Agent, or Firm* — Snell & Wilmer L.L.P.

(57) ABSTRACT

Distributing sensing systems that are capable of wirelessly communicating power and data over power lines are provided. The distributed sensing system may comprise a distributed sensing portion and a primary portion. The distributed sensing portion may include a sensor, an analog to digital converter ("ADC") and a microcontroller. The sensor may be capable of monitoring a parameter. The sensor may be configured to output an analog reading. The ADC may be configured to convert the analog reading to a digital signal. The microcontroller may be configured to modulate a power signal to encode the digital signal in the power signal. The primary portion may be configured to wirelessly receive the power signal from the distributed sensing portion. The primary portion may include a signal demodulation module. The signal demodulation module may be configured to extract the digital signal from the power signal.

19 Claims, 6 Drawing Sheets

(56) References Cited

U.S. PATENT DOCUMENTS

2015/0083796 A1\* 3/2015 Kyung ............... G06K 19/0716
235/375

\* cited by examiner

SYSTEMS AND METHODS FOR COMMUNICATING DATA OF A POWER TRANSMISSION LINE

FIELD

The present disclosure relates to sensing system, and more specifically, to a distributed sensing system with a wireless power and data communication protocol.

BACKGROUND

The control unit and/or power source of a distributed sensing system may be located significant distance from a remote sensor. As such, typical systems may require a significant amount of wiring across the entire distributed system. Typically, one set of wires is used to transmit and/or distribute power (to a sensor), and receive back output-data (from the sensor) over another set of wires. Having separate power and data cables effectively doubles the amount of wire needed throughout the system.

SUMMARY

In various embodiments, a distributed sensing system may comprise a distributed sensing portion and a primary portion. The distributed sensing portion may include a sensor, an analog to digital converter ("ADC") and a microcontroller. The sensor may be capable of monitoring a parameter. The sensor may be configured to output an analog reading. The ADC may be configured to convert the analog reading to a raw digital signal. The microcontroller may be configured to compensate the raw digital signal to a conditioned digital signal based on a measured parameter and to modulate a power signal to encode the conditioned digital signal in the power signal. The primary portion may be configured to wirelessly provide the power signal to the distributed sensing portion. The primary portion may include a signal demodulation module. The signal demodulation module may be configured to extract the conditioned digital signal from the power signal based on the modulating by the microcontroller.

A method for operating a distributed sensing system is provided. The method may comprise measuring, with a sensor of a distributing sensing portion of a distributed sensing system, a parameter; converting, by an ADC, an analog signal from the sensor to a raw digital signal; conditioning, by a microcontroller, the raw digital signal to a conditioned digital signal based on the parameter; modulating, by a load modulation module, a power signal to encode the conditioned digital signal in response to the load modulation module receiving an output from the microcontroller; transmitting wireless and via a second rotary transformer portion associated with the distributed sensing portion, the power signal to a primary rotary transformer portion of a primary portion of the distributed sensing system; extracting, by a load demodulation circuit, the conditioned digital signal from the power signal; and analyzing, by a controller, the conditioned digital signal to determine the parameter measured by the sensor.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step.

In various embodiments, systems with distributing sensing capabilities may employ a signal monitoring system that allows for power and data to be communicated over the same power distribution channels (e.g., power supply and/or wires). By employing this type of system the complexity and amount of wires in a system may be reduced, reducing the overall weight of the aircraft. For example, a traditional system may use separate power distribution lines and data communication lines for each sensor in a distributed sensing system. However, by using the power distribution lines to communicate data, the complexity and overall number of lines may be reduced.

In various embodiments, the system may comprise a static portion and a non-static portion. This arrangement may require that the static portion is wirelessly coupled to the non-static portion. The system may employ a transformer in order to 'jump' and/or transmit power and data across the wireless gap. In this regard, the transformer may comprise a primary portion and a secondary portion. The primary portion may be mounted to the static portion and the second portion may be mounted to the secondary portion.

In various embodiments, the systems described herein may be used in various systems and applications including, for example, down-hole drilling, military applications, constructions applications, transportation applications and/or the like. While described in the context of aircraft applications, and more specifically, in the context of tire pressure monitoring, the various embodiments of the present disclosure may be applied to any suitable application.

Figure 1:
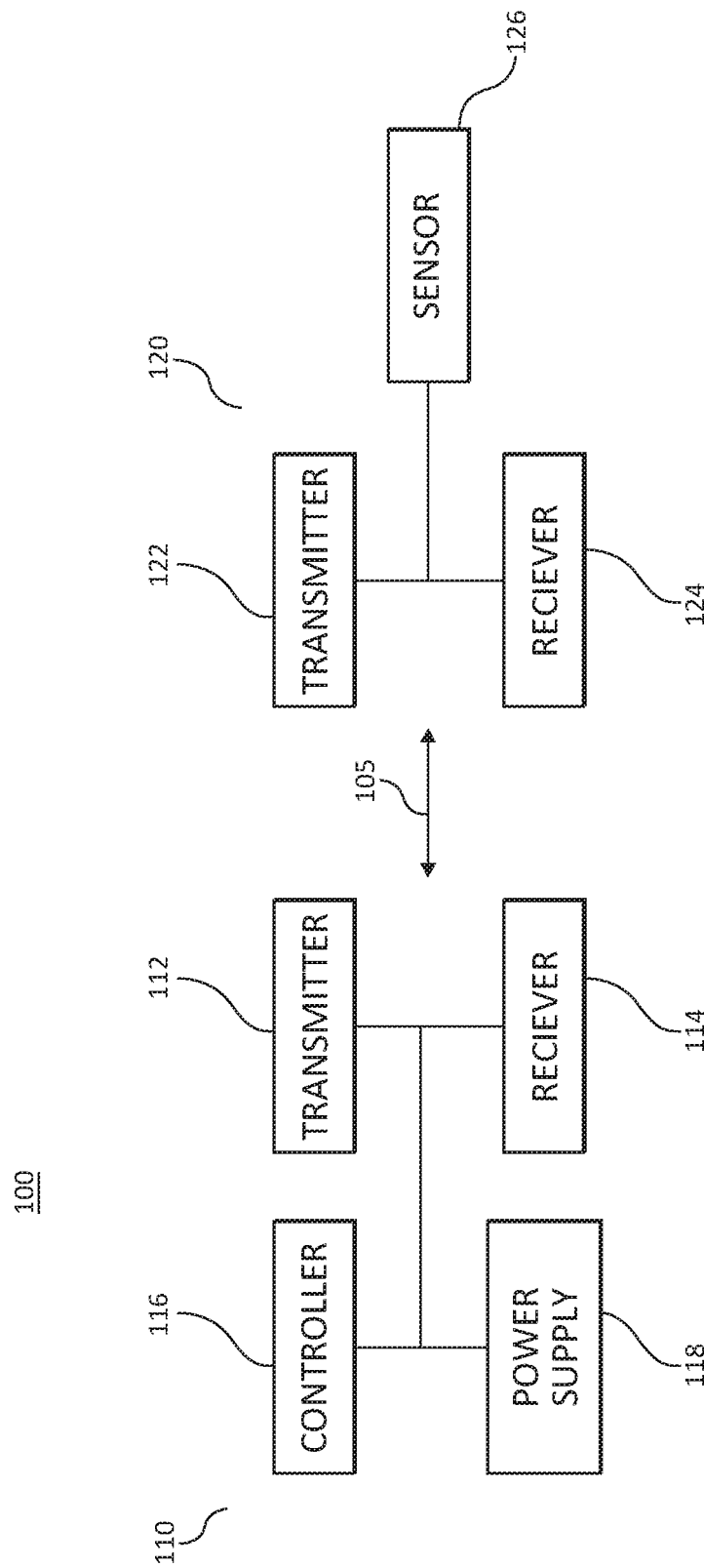
FIG. 1 is a block diagram of a distributed sensing system having a wireless power and data communication protocol, in accordance with various embodiments.

In various embodiments and with reference to FIG. 1, a distributed sensing system 100 (hereinafter "system 100") may be any suitable system that is configured to and/or capable of providing power and communicating data over the same line (e.g., power distribution lines). System 100 may comprise a first portion, a stationary portion, a major portion, and/or a primary portion 110. System 100 may also comprise a second portion, a rotating portion, a minor portion, and/or a distributed sensing portion 120.

In various embodiments, primary portion 110 may comprise a controller 116 and a power supply 118. Controller 116 may be configured to send and receive data. Power supply 118 may be configured to provide power to distributed sensing portion 120. Primary portion 110 may also comprise a transmitter 112, a receiver 114 and/or a transceiver that is configured to transmit and receive power and/or data. Sensor 126 may be configured to monitor any suitable parameter. Distributed sensing portion 120 may also comprise a transmitter 122, a receiver 124, and/or a transceiver that is configured to send and receive power and/or data.

In various embodiments, primary portion 110 may be in electronic communication with distributed sensing portion 120. Primary portion 110 may not be physically coupled and/or may not be wired to distributed sensing portion 120. In this regard, primary portion 110 and distributed sensing portion 120 may be inductively coupled to one another. Primary portion 110 may be configured to transmit power and/or data wirelessly via communication 105 to distributed sensing portion 120. Primary portion 110 may employ an inductive power and data transfer system enabling data communication and power transfer between primary portion 110 and distributed sensing portion 120.

Figure 2A:
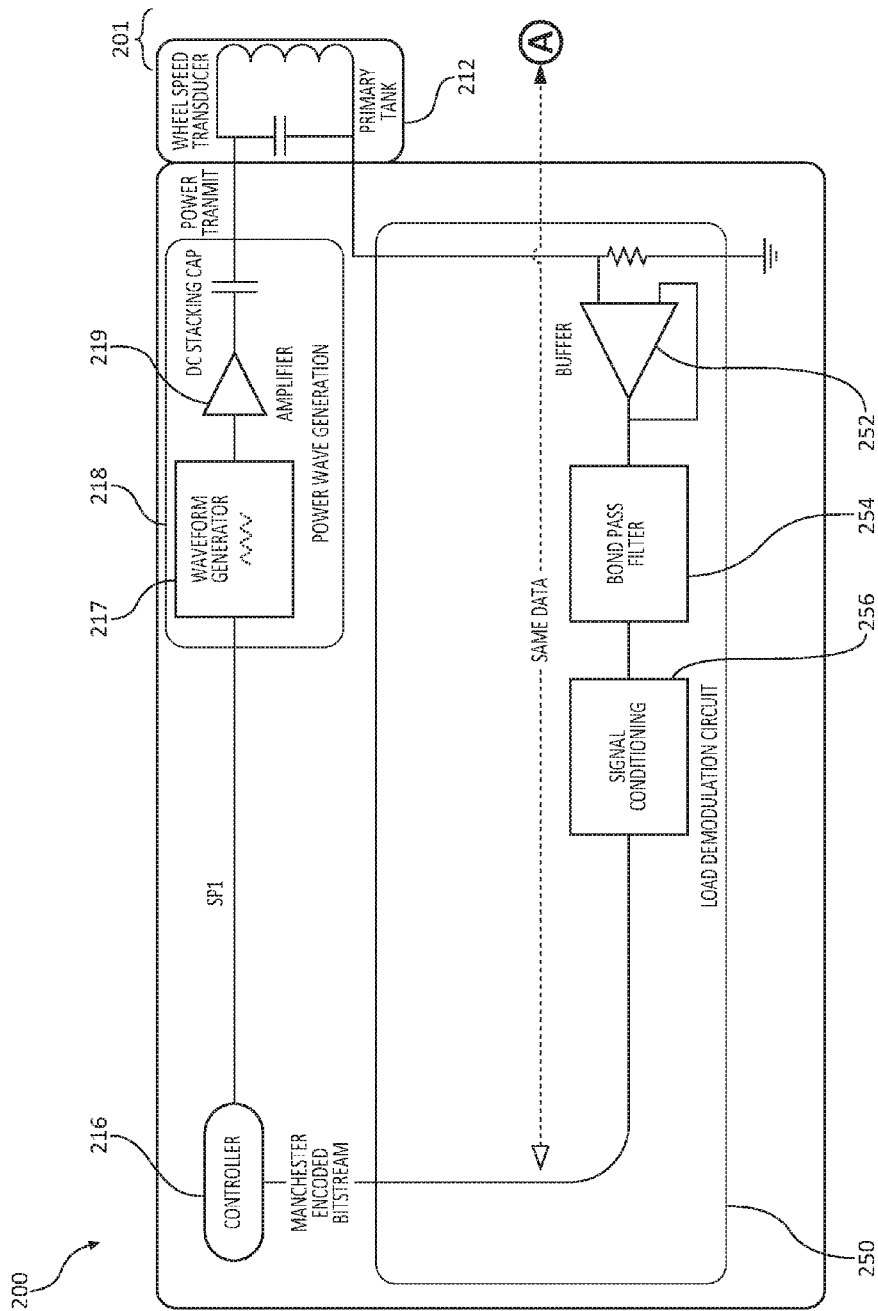
FIG. 2A is a first portion of a wire diagram for a distributed sensing system having a wireless power and data communication protocol, in accordance with various embodiments.
Figure 2B:
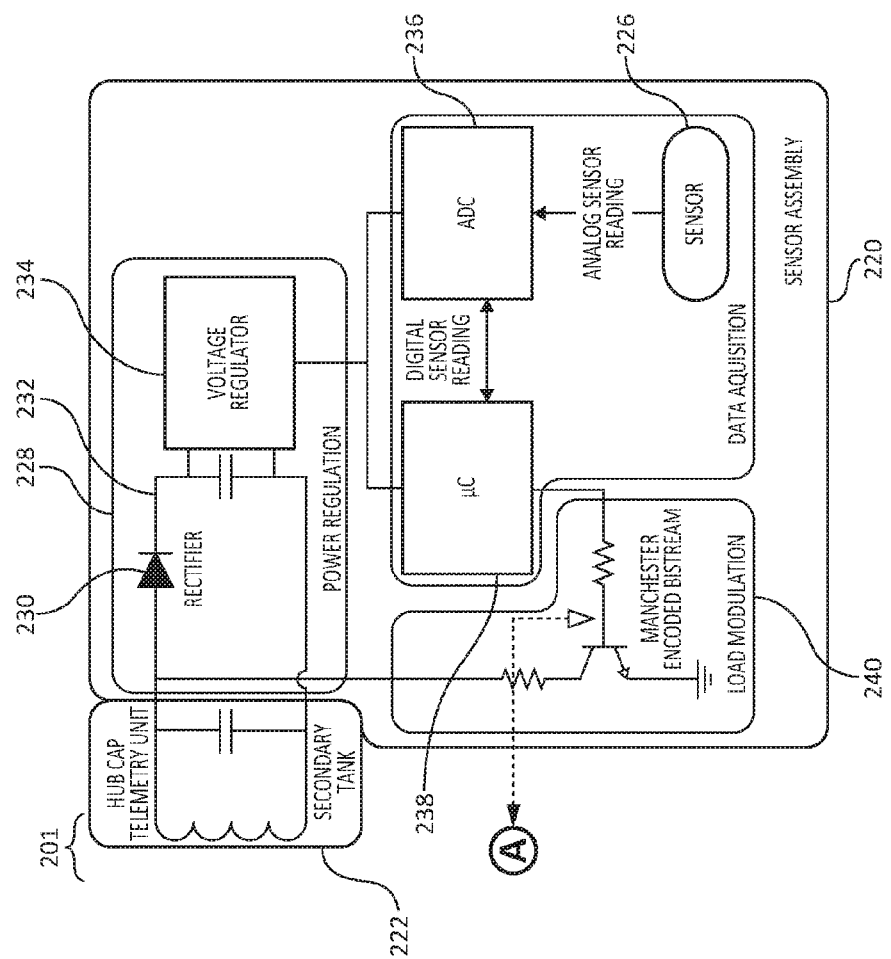
FIG. 2B is a second portion of a wire diagram for a distributed sensing system having a wireless power and data communication protocol, in accordance with various embodiments.

In various embodiments and with reference to FIG. 2A and FIG. 2B, distributed sensing system 200 may include a primary portion 210 and a distributed sensing portion 220. Primary portion 210 may comprise a power generation module 218. Power generation module 218 may comprise a waveform generator 217. Power generation module 218 may also comprise an amplifier 219. Amplifier 219 may be configured to amplify the alternating current ("AC") signal provided by waveform generator 217. Power generation module 218 may be wired in and in electronic communication with primary rotary transformer portion 212. In this regard, primary portion 210 and, more specifically, power generation module 218 may be configured to supply power to distributed sensing portion 220.

Figure 3:
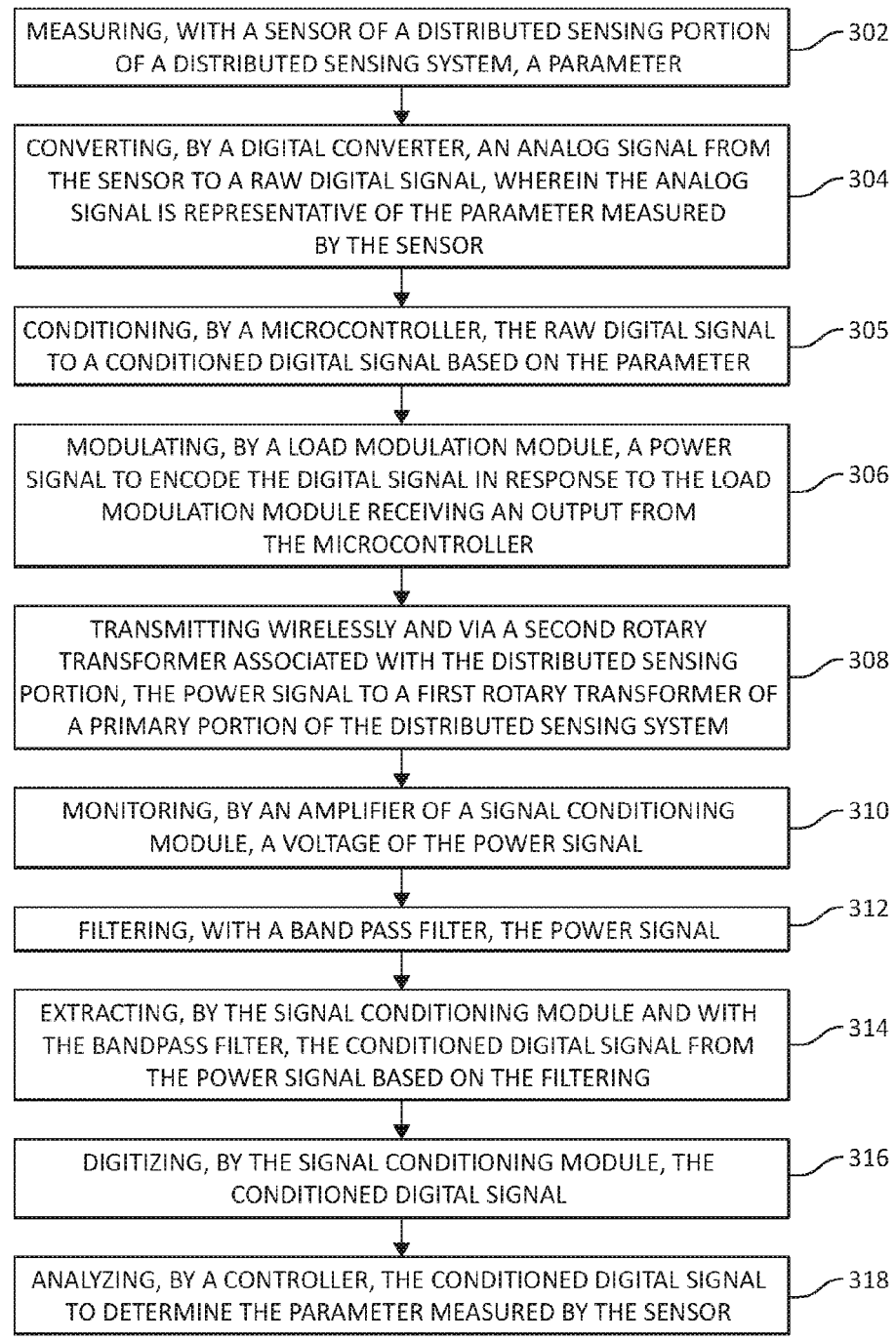
FIG. 3 illustrates a method for operating a distributed sensing system having a wireless power and data communication protocol, in accordance with various embodiments.

In various embodiments and with reference to FIG. 2A, FIG. 2B, and FIG. 3, distributed sensing portion 220 may be configured to receive power from primary portion 210. In this regard, distributed sensing portion 220 may have no internal power source of its own. Distributed sensing portion 220 may also be configured to communicate data (e.g., data detected by sensor 226) back to primary portion 210. More specifically, data from distributed sensing portion 220 may be communicated to controller 216 via signal demodulation module 250. Distributed sensing portion 220 may be configured to alter the current draw of the incoming power signal (e.g., load modulation) that can be monitored and/or measured by primary portion 210.

In various embodiments, distributed sensing portion 220 may comprise a sensor assembly including sensor 226, an analog to digital converter ("ADC") 236, and a microcontroller 238. Sensor 226 may be any suitable sensing element including, for example, a pressure sensing element, a temperature sensing element, a viscosity sensing element, and/or the like. Sensor 226 may be configured to monitor one or multiple parameters.

In various embodiments and in operation, distributed sensing system 200 may be configured to and/or may be capable of performing a method 300. Method 300 may include measuring, with sensor 226 of distributed sensing portion 220, a parameter (Step 302). Sensor 226 may be configured to output an analog signal. The analog sensor reading may be communicated to ADC 236. Method 300 may further include converting, by ADC 236, the analog signal from sensor 226 to a raw digital signal (Step 304). The analog signal may be representative of the parameter measured by the sensor 226. ADC 236 may communicate the digital representation of the analog reading to microcontroller 238.

In various embodiments, method 300 may further include conditioning, by a microcontroller, the raw digital signal to a conditioned digital signal based on the parameter (Step 305). In this regard, microcontroller 238 may be configured to compensate the raw digital signal to a conditioned digital signal based on a measured parameter. The measured parameter may be any suitable parameter such as for example, temperature, humidity, and/or the like. Moreover, microcontroller 238 may be configured to modulate a power signal to encode the conditioned digital signal in the power signal In various embodiments, distributed sensing portion 220 may further comprise a power regulation module 230. Power regulation module 230 may comprise a rectifier 228. Rectifier 228 may be configured to convert an alternating current ("AC") signal received from primary portion 210 to a direct current ("DC") signal. The DC energy may be stored on capacitor 232 to sustain a power input voltage to voltage regulator 234. In this regard, the current stored on capacitor 232 may be supplied at a prescribed rate by voltage regulator 234 to the sensor assembly and, more specifically, to at least one of sensor 226, ADC 236, and/or microcontroller 238. The AC signal supplied from primary portion 210 to distributed sensing portion 220 may also be supplied to a load modulation module 240 on distributed sensing portion 220.

In various embodiments, load modulation module 240 may be in electronic communication with microcontroller 238. Load modulation module 240 may be any suitable electrical component configured to modulate the current draw of an AC signal or a DC signal. In this regard, method 300 may further comprise modulating, by load modulation module 240, a power signal to encode the digital signal in response to load modulation module 240 receiving an output from microcontroller 238 (Step 306).

In various embodiments, load modulation module 240 may comprise a transistor 242 that is configured to modulate the load on sensor 226, which may alter the current flow to distributed sensing portion 220 and the voltage drop across wireless gap 201. This voltage drop power signal may be detected by primary portion 210 via primary rotary transformer portion 212 over wireless gap 201. Microcontroller 238 may provide, via load modulation module 240, a serial bit stream (e.g. a series of ones and zeros arranged in a specific fashion as a representation of the parameter detected by sensor 226). The output of microcontroller 238 may be used to up modulate or down modulate the power signal that is communicated back to primary portion 210. In this regard, the modulation of the power signal may encode the serial bit stream outputted by the microcontroller.

In various embodiments and in operation, method 300 may further comprise transmitting wirelessly and via a second rotary transformer portion 222 associated with distributed sensing portion 220, the power signal to a primary rotary transformer portion 212 of primary portion 210 of distributed sensing system 200 (Step 308). Primary rotary transformer portion 212 may communicate the modulated AC signal to signal demodulation module 250.

In various embodiments, signal demodulation module 250 may comprise an amplifier 252, a band-pass filter 254, a signal conditioning module 256 and/or any other suitable filtering or signal conditioning components. In operation, method 300 may further comprise amplifying, by amplifier 252 of signal demodulation module 250, the power signal to increase the signal to noise ratio (Step 310). In this regard, the modulations in the power signal may be amplified to further define the signal from the noise of the wireless transmission and/or power signal.

In various embodiments and in operation, method 300 may further comprise filtering, with band-pass filter 254, the power signal (Step 312). The filtering may eliminate and/or isolate portions of the power signal including, for example, the carrier signal (e.g., the AC power signal modulated by load modulation module 240), noise and/or the like. Method 300 may further comprise extracting, by the signal conditioning module 256 and with the output of band-pass filter 254, the conditioned digital signal from the power signal based on the filtering (Step 314).

In various embodiments and in operation, method 300 may further comprise digitizing, by signal conditioning 256, the conditioned digital signal (Step 316). The digitizing of the digital signal may include conditioning the signal to make it suitable for further processing by microelectronics. Method 300 may further comprise analyzing, by controller 216, the conditioned digital signal to determine the parameter measured by sensor 226 (Step 318). The controller may further be capable of transmitting or otherwise indicating information about the parameter such as, for example, providing a measured value, providing an indication of the level of the parameter, providing an indication that the parameter is within or outside a defined range, and/or providing or indicating any other suitable information about the parameter.

Figure 4A:
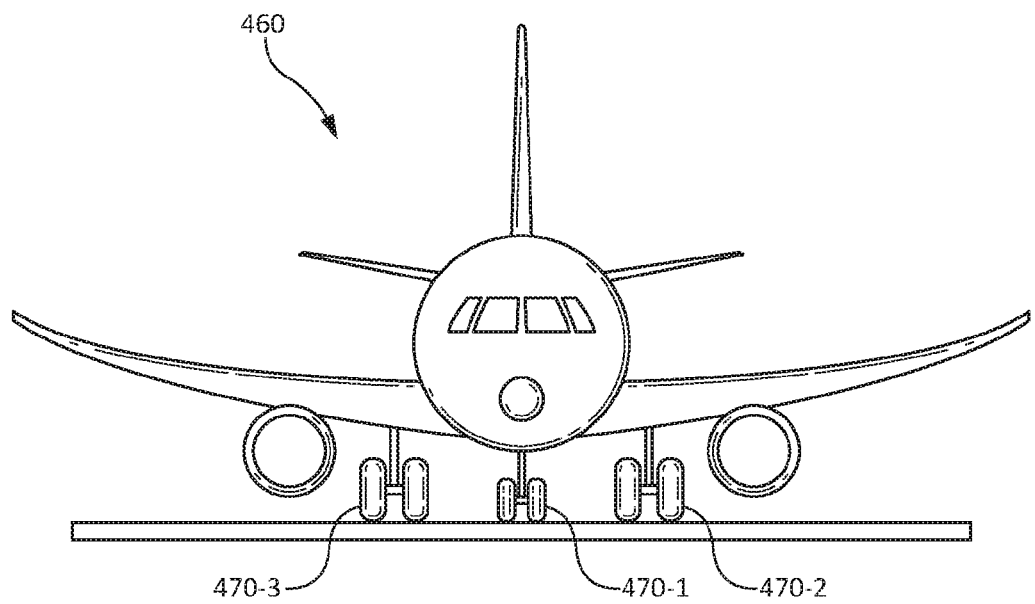
FIG. 4A illustrates a front view of an aircraft with deployed landing gear, in accordance with various embodiments.
Figure 4B:
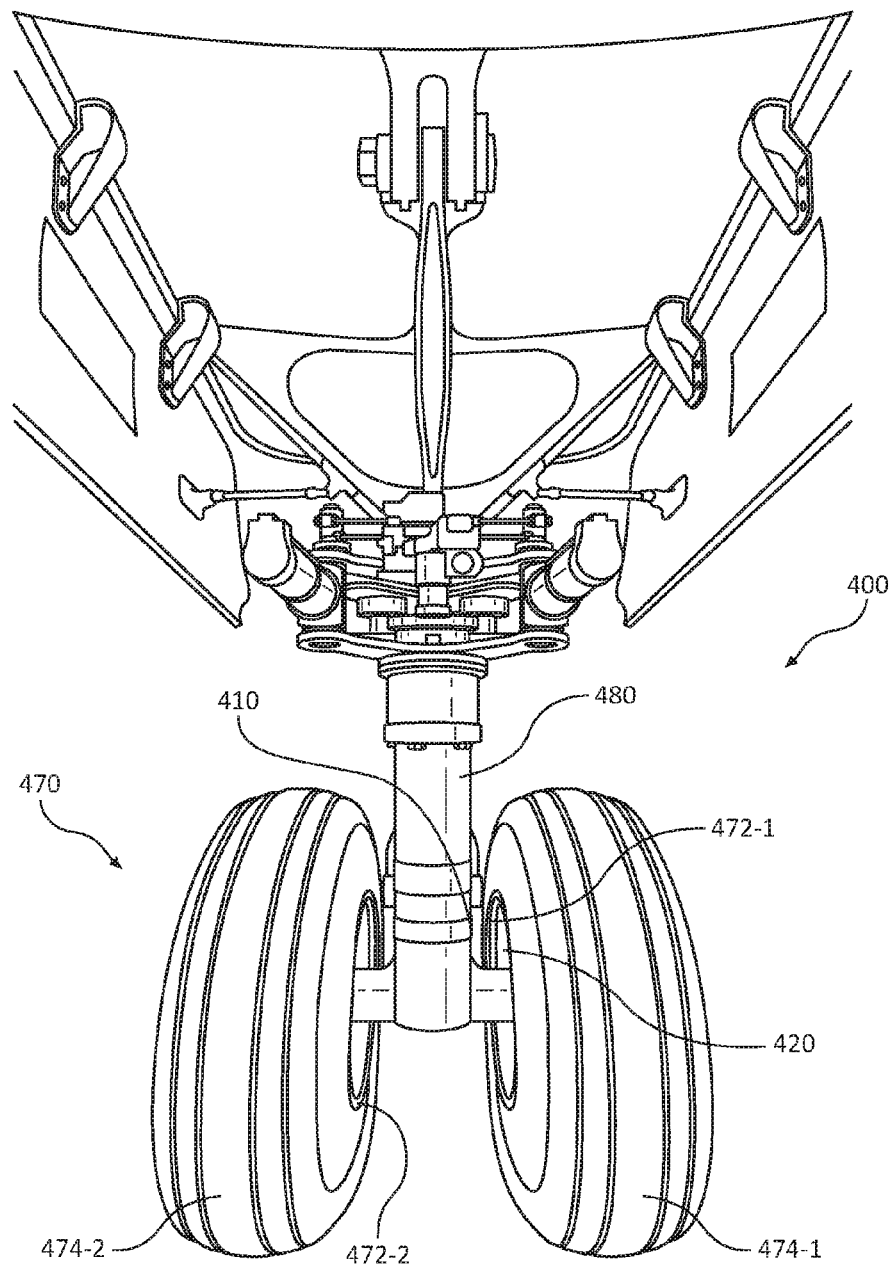
FIG. 4B illustrates a front view of a landing gear, in accordance with various embodiments.

In various embodiments and with reference to FIGS. 4A-4B, system 400 may include the components and capabilities of distributed sensing system 200, as shown in FIG. 2A and FIG. 2B, and as described herein. Moreover, system 400 may be implemented on an aircraft 460 as a wheel or tire monitoring system 400 (hereinafter, "monitoring system 400"). The monitoring system 400 may be configured to monitor parameters associated with wheel 472-1 and/or wheel 472-2 or tire 474-1 and/or tire 474-2.

In various embodiments, monitoring system 400 may be installed on one or more landing gear including, for example, landing gear 470-1, landing gear 470-2, and landing gear 470-3 in FIG. 4A and landing gear 470. Landing gear 470-1, landing gear 470-2, and landing gear 470-3 may generally support the aircraft when it is not flying, allowing it to take off, land, and taxi without damage.

In various embodiments and with specific reference to FIG. 4B, landing gear 470 may comprise wheel 472-1 and wheel 472-2. Wheel 472-1 and wheel 472-2 may be coupled to landing gear strut 480. Wheel 472-1 may be operatively coupled to a tire 474-1. In this regard, tire 474-1 may be mounted on wheel 472-1. Tire 474-1 may define a pressurizable chamber between tire 474-1 and wheel 472-1. Similarly, a tire 474-2 may be mounted on and/or coupled to wheel 472-2.

In various embodiments, it may be desirable to monitor tire pressure for tire 474-1 and/or tire 474-2 (e.g., the pressure inside the chamber defined between tire 474-1 and wheel 472-1 and/or tire 474-2 and wheel 472-2). In this regard, distributed sensing portion 420 of monitoring system 400 may be installed on wheel 472-1 and/or wheel 472-2. Primary portion of monitoring system 400 may be installed in relatively close proximity to distributed sensing portion 420. In this installation application, distributed sensing portion 420 may be installed on a rotating component (e.g., wheel 472-1 or wheel 472-2) and primary portion 410 may be installed on a stationary structure (e.g., landing gear strut 480).

In various embodiments, monitoring system 400 may be capable of being read during an on-ground inspection (e.g., a pilot walk around). In this regard, monitoring system 400 may be read with a "wand device" (e.g., a detector, a smart phone, and/or the like). Monitoring system 400 may also comprise a suitable indicator (e.g., a visual indicator, an audio indicator, and/or the like).

In various embodiments, monitoring system 400 may be further communication with a brake control unit or other suitable controller. In this regard, data from monitoring system 400 may be analyzed to provide an indication of a tire condition such as, for example, tire pressure, tire temperature, and/or the like. For example, monitoring system 400 and/or the brake control unit may cause a cockpit light to be illuminated in response to a tire pressure condition being below a threshold. Moreover, monitoring system 400 and/or the brake control unit may be capable of transmitting and/or displaying a sensed pressure in the cockpit.

In various embodiments, tire pressure may be checked as part of daily aircraft maintenance activities. This check may include, for example, a visual inspection and an evaluation of tire pressure based on a tire pressure reading from monitoring system 400. The monitoring system 400 and/or the brake control unit may be capable of alerting a crew member to a low tire pressure condition in response to a flight event (e.g., a taxi, takeoff, and/or landing). For example, monitoring system 400 and/or the brake control unit may also be capable of measuring tire pressure and/or indicating low tire pressure in flight and/or prior to a landing event.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A distributed sensing system for monitoring a tire of an aircraft, the distributed sensing system comprising:
   a distributed sensing portion coupled to a wheel of the aircraft and configured to receive a power signal from a primary portion, the distributed sensing portion including,
      a sensor coupled to the wheel and capable of monitoring a parameter of the tire and outputting an analog reading,
      an analog to digital converter configured to convert the analog reading to a raw digital signal, and
      a microcontroller configured to compensate the raw digital signal to a conditioned digital signal based on a measured parameter and to modulate the power signal received from the primary portion to encode the conditioned digital signal in the power signal by modulating a current flow to the distributed sensing portion; and
   the primary portion coupled to a landing gear of the aircraft and configured to wirelessly provide the power signal to the distributed sensing portion and including,
      a signal demodulation module configured to extract the conditioned digital signal from the power signal based on the modulating by the microcontroller, and wherein the primary portion is in communication with a brake control unit of the aircraft.

2. The distributed sensing system of claim 1, wherein the primary portion is configured to wirelessly supply power to and wirelessly receive data from the distributed sensing portion.

3. The distributed sensing system of claim 1, wherein the primary portion further includes a waveform generator.

4. The distributed sensing system of claim 3, wherein the waveform generator is electrically coupled to a primary rotary transformer portion.

5. The distributed sensing system of claim 4, wherein the primary rotary transformer portion is configured to transmit an alternating current signal to a second rotary transformer portion associated with the distributed sensing portion.

6. The distributed sensing system of claim 5, wherein the alternating current signal is modulated by a load modulation module in response to an input from the microcontroller.

7. The distributed sensing system of claim 1, wherein the signal demodulation module comprises a bandpass filter that is configured to filter the power signal.

8. The distributed sensing system of claim 7, wherein the signal demodulation module is configured to condition the conditioned digital signal.

9. The distributed sensing system of claim 8, wherein the primary portion includes a controller that is configured to process the conditioned digital signal and indicate the parameter.

10. A method for monitoring a tire of an aircraft, comprising:
    measuring, with a pressure sensor of a distributed sensing portion of a distributed sensing system, a pressure of the tire;
    converting, by an analog to digital converter, an analog signal from the pressure sensor to a raw digital signal;
    conditioning, by a microcontroller, the raw digital signal to a conditioned digital signal based on the pressure measured by the pressure sensor;
    modulating, by a load modulation module of the distributed sensing portion, a power signal to encode the conditioned digital signal by modulating a current flow to the distributed sensing portion in response to the load modulation module receiving an output from the microcontroller;
    transmitting wirelessly, and via a second rotary transformer portion associated with the distributed sensing portion, the power signal to a primary rotary transformer portion of a primary portion of the distributed sensing system;
    extracting, by a signal conditioning module, the conditioned digital signal from the power signal; and
    analyzing, by a brake control unit of the aircraft, the conditioned digital signal to determine the pressure measured by the pressure sensor.

11. The method of claim 10, further comprising monitoring, by an amplifier of a signal demodulation module, a voltage of the power signal.

12. The method of claim 11, further comprising filtering, with a band pass filter, the power signal.

13. The method of claim 10, further comprising digitizing, by the signal conditioning module, the conditioned digital signal.

14. The method of claim 11, wherein the power signal is a power waveform generated by a waveform generator in the primary portion.

15. The method of claim 10, wherein the load modulation module comprises a transistor in electronic communication with the microcontroller that is configured to modulate the power signal at the pressure sensor.

16. The method of claim 10, wherein the distributed sensing portion is coupled to a rotating component of the aircraft.

17. The method of claim 10, wherein the distributed sensing portion is coupled to a wheel of the aircraft, and wherein the primary portion is coupled to a landing gear strut of the aircraft.

18. The distributed sensing system of claim 1, wherein the sensor comprises a pressure sensor, and wherein the parameter comprises a pressure within a chamber defined between the tire and the wheel of the aircraft.

19. The distributed sensing system of claim 1, wherein the sensor comprises a temperature sensor, and wherein the parameter comprises a temperature of the tire.

* * * * *